United States Patent
Tazawa et al.

(10) Patent No.: US 7,147,011 B2
(45) Date of Patent: Dec. 12, 2006

(54) METHOD FOR PACKING SOLID CATALYST

(75) Inventors: Kazuharu Tazawa, Mie (JP); Isao Teshigahara, Mie (JP); Teruo Saito, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 46 days.

(21) Appl. No.: 11/045,123

(22) Filed: Jan. 31, 2005

(65) Prior Publication Data

US 2005/0161373 A1    Jul. 28, 2005

Related U.S. Application Data

(63) Continuation of application No. PCT/JP2004/14225, filed on Sep. 29, 2004.

(30) Foreign Application Priority Data

Jan. 22, 2004    (JP) .............................. 2004-014632

(51) Int. Cl.
*B65B 1/04*     (2006.01)
(52) U.S. Cl. ....................... 141/1; 141/286; 414/299
(58) Field of Classification Search ................ 141/286, 141/671, 98; 414/299, 300
See application file for complete search history.

(56) References Cited

U.S. PATENT DOCUMENTS 5,888,355 A * 3/1999 Mikitenko et al. .......... 422/191
5,906,229 A * 5/1999 Haquet et al. .............. 141/286
6,632,414 B1 * 10/2003 Liu ............................ 423/659

FOREIGN PATENT DOCUMENTS

| JP | 54-95974 | 7/1979 |
| JP | 63-9548 | 3/1988 |
| JP | 5-31351 | 2/1993 |
| JP | 9-141084 | 6/1997 |
| JP | 10-277381 | 10/1998 |
| WO | WO 03/057653 A1 | 7/2003 |

* cited by examiner

*Primary Examiner*—Steven O. Douglas
(74) *Attorney, Agent, or Firm*—Oblon, Spivak, McClelland, Maier & Neustadt, P.C.

(57) ABSTRACT

A method for packing a solid catalyst is provided, whereby the pressure loss of a reaction tube packed with the catalyst can be reduced.

The method is characterized in that prior to packing a solid catalyst in a reactor, the solid catalyst is sieved to remove a cracked catalyst. For example, sieving is carried out against a solid catalyst of a columnar or cylindrical shape having an outer diameter A being larger than the length B in the axial direction by using a sieve having a sieve mesh with a width C satisfying the condition of A>C>B and a length being at least the width, or against a solid catalyst of a columnar or cylindrical shape with an outer diameter A being from 1 to 0.5 time the length B in the axial direction by using a sieve having a sieve mesh with a width C satisfying the condition of A>C>0.5B and a length being at least the width.

5 Claims, 3 Drawing Sheets

METHOD FOR PACKING SOLID CATALYST

TECHNICAL FIELD

The present invention relates to a method for packing a solid catalyst in a reactor, particularly to a method wherein a solid catalyst is sieved prior to packing it in a fixed bed reactor.

BACKGROUND ART

To pack a molded catalyst or a supported catalyst in a fixed bed reactor, it is common to employ a packing method wherein the catalyst is dropped from an upper portion of the reactor. In such a method, the catalyst may be pulverized or disintegrated by the physical impact at the time of the dropping. This tendency is distinct especially in the case of a molded catalyst or a supported catalyst which does not have high mechanical strength. The following may be mentioned as methods for suppressing such pulverization or disintegration of the catalyst at the time of packing.

In a case where a catalyst is to be packed in a reactor by dropping it from an upper portion of the reactor, a method is known wherein strings having a shape and a size substantially not to hinder the dropping of the catalyst, are provided in the reactor (Patent Document 1). Further, when a solid catalyst is to be packed in a reaction tube installed in a reactor by dropping the catalyst from an upper portion of the reaction tube, a method is known wherein a liquid is firstly filled in the reaction tube, then the solid catalyst is packed, and thereafter, the liquid is removed from the reaction tube (Patent Document 2). Further, as another method, a method is known wherein prior to packing a solid catalyst by dropping it into a reaction tube of a reactor, dry ice is packed in the reaction tube, then the catalyst is packed, and then, dry ice is removed by evaporation (Patent Document 3).

Patent Document 1: JP-A-5-31351
Patent Document 2: JP-A-9-141084
Patent Document 3: JP-A-10-277381

DISCLOSURE OF THE INVENTION PROBLEM TO BE SOLVED BY THE INVENTION

A molded catalyst or a supported catalyst which does not have a high mechanical strength, is susceptible to not only such pulverization or disintegration during the packing into the reactor, but also cracking by a physical impact in its production step before the packing, or cracking at the bottom of a drum during its storage in the drum after the production. Such a cracked catalyst has the mechanical strength further weakened and thus is further susceptible to pulverization at the time of packing. Further, the spaces of the packed catalyst are likely to be filled with a cracked and finely pulverized catalyst, whereby not only the packing density of the catalyst will increase, but also the pressure loss of the reaction tube will increase.

Accordingly, when the catalyst is to be packed in a reaction tube, it is necessary to remove a cracked catalyst contained in the catalyst. In such a case, if the removal of the cracked catalyst is inadequate, the above-mentioned packing density and pressure loss will increase as compared with a case where a non-cracked normal catalyst is packed in the reaction tube, whereby the reaction may not be carried out under the predetermined operation conditions.

The above-mentioned Patent Documents 1 to 3, while disclosing methods for packing a catalyst in a reaction tube so as to avoid cracking, fail to disclose or suggest a method for efficiently removing a catalyst already cracked before the packing, or that the pressure loss of a reaction tube can be reduced by removal of a cracked catalyst. Accordingly, even if no pulverization or disintegration takes place during packing of a catalyst as disclosed in Patent Documents 1 to 3, if a cracked catalyst has already been included before the packing, such a cracked catalyst will be packed into a reaction tube as it is, whereby the above problem can not be solved.

It is an object of the present invention to provide a method for efficiently removing, before the packing, such a cracked catalyst which causes the pressure loss of a reaction tube when a solid catalyst such as a molded catalyst or a supported catalyst is packed into a fixed bed reactor.

Means to Solve the Problem

As a result of various studies made to solve the above problem, the present invention has been accomplished on the basis of a discovery that the pressure loss of a reactor can be reduced by removing a cracked catalyst by sieving and further that the cracked catalyst can efficiently be removed if the sieving is carried out by means of a sieve having a specific sieve mesh. Namely, the present invention provides the following method for packing a solid catalyst.

1. A method for packing a solid catalyst, characterized in that prior to packing a solid catalyst in a reactor, the solid catalyst is sieved to remove a cracked catalyst.
2. The method for packing a solid catalyst according to the above 1, wherein sieving is carried out against a solid catalyst of a columnar or cylindrical shape having an outer diameter A being larger than the length B in the axial direction by using a sieve having a sieve mesh with a width C satisfying the condition of A>C>B and a length being at least the width.
3. The method for packing a solid catalyst according to the above 1, wherein sieving is carried out against a solid catalyst of a columnar or cylindrical shape having an outer diameter A being larger by more than $\sqrt{2}$ times the length B in the axial direction by using a sieve having a circular sieve mesh with a diameter C satisfying the condition of A>C>B.
4. The method for packing a solid catalyst according to the above 1, wherein sieving is carried out against a solid catalyst of a columnar or cylindrical shape with an outer diameter A being from 1 to 0.5 time the length B in the axial direction by using a sieve having a sieve mesh with a width C satisfying the condition of A>C>0.5B and a length being at least the width.
5. The method for packing a solid catalyst according to any one of the above 2 to 4, wherein the proportion of C to A is at least 90%.
6. The method for packing a solid catalyst according to the above 1, wherein a solid catalyst of a spherical shape having an outer diameter of D is sieved by using a sieve having a sieve mesh with a width E satisfying the condition of D>E>0.5D and a length being larger than D.

EFFECTS OF THE INVENTION

According to the present invention, a molded catalyst or a supported catalyst is sieved by a sieve having a specific sieve mesh before it is packed in a reaction tube of a fixed bed reactor, whereby a cracked catalyst can efficiently be removed. It is thereby possible to reduce the pressure loss of the reaction tube packed with the catalyst and to provide

MEANINGS OF SYMBOLS

1: Catalyst
2: Opening
3: Cracked portion
4: Flat surface

BEST MODE FOR CARRYING OUT THE INVENTION

The shape of the solid catalyst which may be employed in the present invention, may be selected from a spherical shape, a columnar shape and a cylindrical shape. It is common to employ a molded catalyst formed by e.g. a usual tabletting machine, extruder or tumbling granulator. When a supported catalyst is to be employed, the type of the carrier is not particularly limited, and a usual carrier such as silica, alumina, silica/alumina, magnesia or titania, may, for example, be employed. Also the shape of the supported catalyst may be selected from a spherical shape, a columnar shape and a cylindrical shape like the above molded catalyst. The solid catalyst in the present invention includes such a supported catalyst, and a simple term "catalyst" is meant for a solid catalyst.

As mentioned above, the solid catalyst may be cracked by a physical impact during the production step of the catalyst, or during the storage or transportation of the produced catalyst in a drum, the catalyst at the bottom of the drum may be disintegrated under load. In the present invention, pulverization (inclusive of powdering) by such cracking or disintegration of a normal catalyst, is referred to as cracking, and a catalyst obtained by such cracking is generally referred to as "a cracked catalyst". Such cracking of a catalyst is more likely as the strength of the catalyst is weaker, but the strength of the catalyst varies depending upon the shape or size of the catalyst even with the same material. Further, the manner of cracking varies depending upon the shape of the catalyst. Generally, a cylindrical or columnar catalyst is more susceptible to cracking than a spherical catalyst, and a cylindrical or columnar catalyst becomes susceptible to cracking as it becomes flat or slender. Further, a larger one is more susceptible to cracking than a smaller one.

Figure 1:
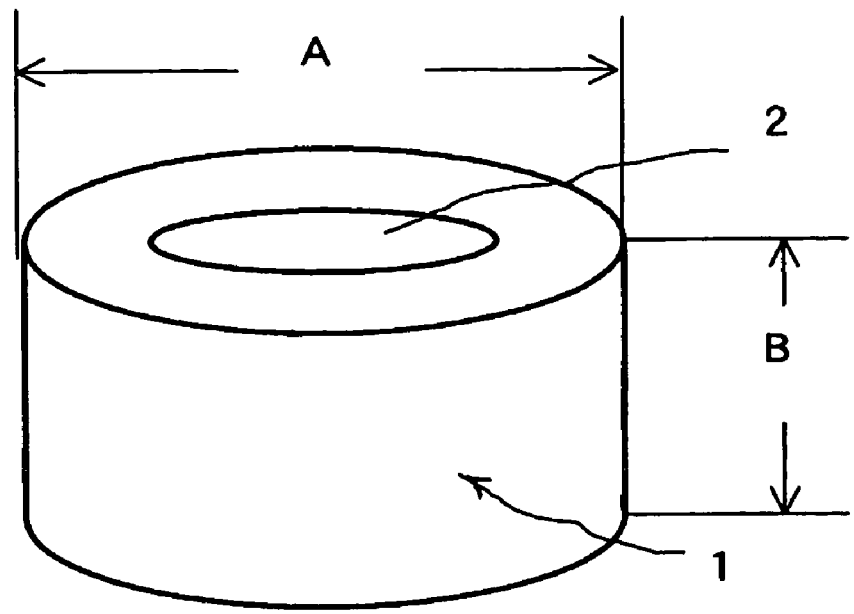
FIG. 1 is a perspective view of a cylindrical catalyst according to the present invention.
Figure 2:
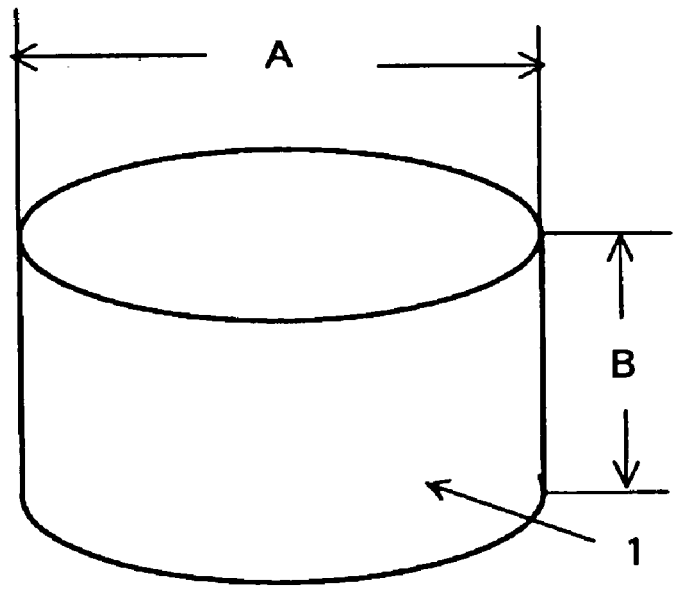
FIG. 2 is a perspective view of a columnar catalyst according to the present invention.

Now, such cracking of a catalyst will be described in detail. FIG. 1 shows a cylindrical catalyst 1 having an opening 2 at the center, and FIG. 2 shows a columnar catalyst 1. In such a cylindrical or columnar catalyst 1, A represents the outer diameter of the catalyst 1, and B represents the length (height) in the axial direction. With such a catalyst 1, if A becomes larger than B, the catalyst 1 becomes flat, and inversely, if B becomes larger than A, it becomes elongated in the axial direction. When a cylindrical or columnar catalyst 1 is cracked by an external force or impact, a longer dimension is more susceptible to the force, and accordingly, the cracking direction (the cracking manner) is generally determined depending upon whether the catalyst 1 is flat or elongated. The direction is either the axial direction (longitudinal direction) of the catalyst or the direction crossing the axis (transverse direction), and cracking of a catalyst 1 may generally be classified into a crack in the flat surface i.e. cracking in the axial direction and a crack in the side surface i.e. cracking in a direction crossing the axis. A crack of a catalyst 1 is basically the same for a columnar catalyst and a cylindrical catalyst. Accordingly, in the following, cracking will be described with reference to a columnar catalyst.

Figure 3:
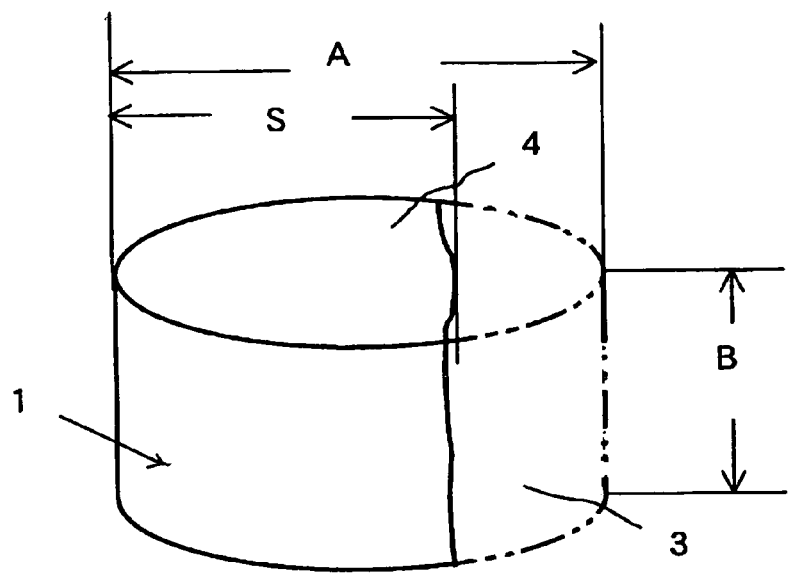
FIG. 3 is a view illustrating a crack in the flat surface of the cylindrical catalyst.

As shown in FIG. 3, a crack in the flat surface of the columnar catalyst 1 is cracking in the axial direction starting from the flat surface 4 of the catalyst 1. The position on the flat surface 4 at which cracking will start, may not be specified as it depends on the intensity of the force or the manner of receiving the force, but the catalyst 1 will be divided along the axial direction by the crack in the flat surface. For example, as shown in FIG. 3, if the columnar catalyst 1 is cracked on the right hand side of the circular flat surface 4, it will be divided into the main portion (the solid line portion) and a cracked portion 3 (the chain double-dashed line) smaller than the main portion. This crack in the flat surface is likely to be formed on a flat catalyst wherein the outer diameter A is larger than the length B in the axial direction. It is theoretically possible that only a part in the axial direction will be cracked (chipped off), but in reality, due to the flat shape, the majority is one cracked along the entire axial direction as shown in FIG. 3, and a catalyst having a part chipped off in the axial direction is very little. Accordingly, as the shape of the catalyst which can be removed by sieving of a catalyst cracked in the axial direction in the present invention, a catalyst cracked in the entire length in the axial direction is the target, and a catalyst having a portion chipped off in the axial direction is not the target. However, the chipped off portion of the catalyst having the portion chipped off in the axial direction is of course the target to be removed.

Figure 4:
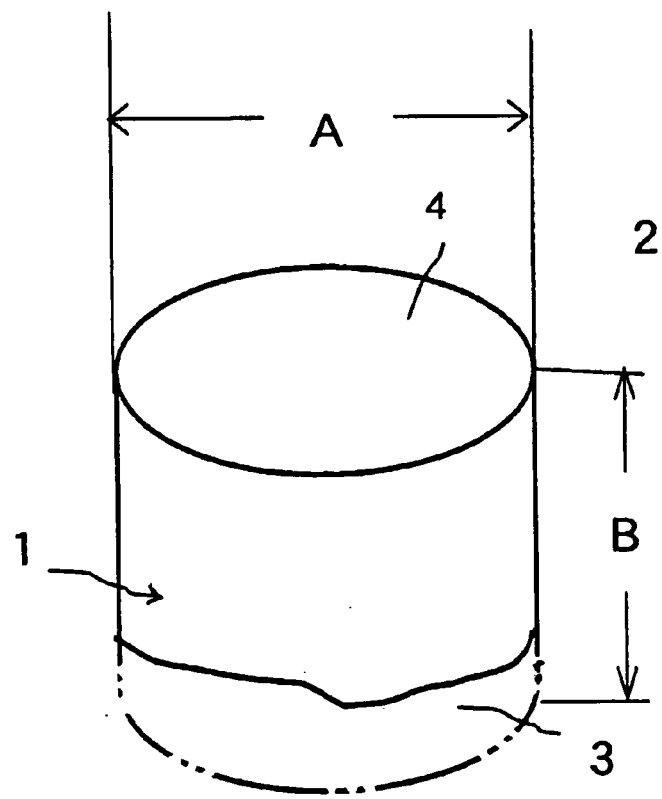
FIG. 4 is a view illustrating a crack in the side surface of the cylindrical catalyst.

On the other hand, a crack in the side surface of the catalyst is cracking in the direction crossing the axial direction of the catalyst 1, as shown in FIG. 4, and it is assumed to be cracking which makes the length short in the axial direction. So long as it is a crack crossing the axial direction of the catalyst, it may be an inclined crack which may not orthogonally cross the axis. In a case where only a portion is cracked (chipped off) in the direction crossing the axial direction, the chipped off portion will be removed in the same manner as the above-mentioned crack in the flat surface, but the rest of the main portion having the length not shortened in the axial direction is not the target to be removed. Such cracking in the side surface takes place frequently with an elongated catalyst with A<B, of which the side surface is susceptible to an external force.

Although not shown in the drawings, cracking of a spherical catalyst is typically assumed to be division of the spherical body. However, a catalyst having a substantial part of the spherical body chipped off will also be the target to be removed.

Now, a method for removing a cracked catalyst by means of a sieve, will be described. The "sieve" here is a general term for a tool, instrument or device equipped or provided with a base material, elemental net or plate having a prescribed sieve mesh, and the "sieving" means a unit operation to separate one passing through the sieve mesh from one not passing through the sieve mesh, by means of such a sieve. In the present invention, the device to remove the cracked catalyst is not particularly limited so long as it is a sieve having such a sieving function.

A sieve which is commonly used for a sieving operation, is usually one having a sieve mesh of a square, rectangular, rhombic, hexagonal or circular shape or the like. In this case, any one of such sieve meshes is capable of separating one which passes through the sieve and one which does not pass through the sieve, depending upon the minimum parallel tangential line distances of projected image contours of the catalyst particles in the relation between the sieve mesh and the catalyst particles to be sieved. Namely, if the minimum parallel tangential line distance is larger than the sieve mesh, such a catalyst particle will not pass through the sieve mesh, while a catalyst particle having such a minimum parallel tangential line distance being smaller than the sieve mesh, will pass through the sieve mesh and thus will be separated. Also in the present invention, this sieving principle is employed to remove a cracked catalyst. Now, sieving will be specifically described.

Figure 5:
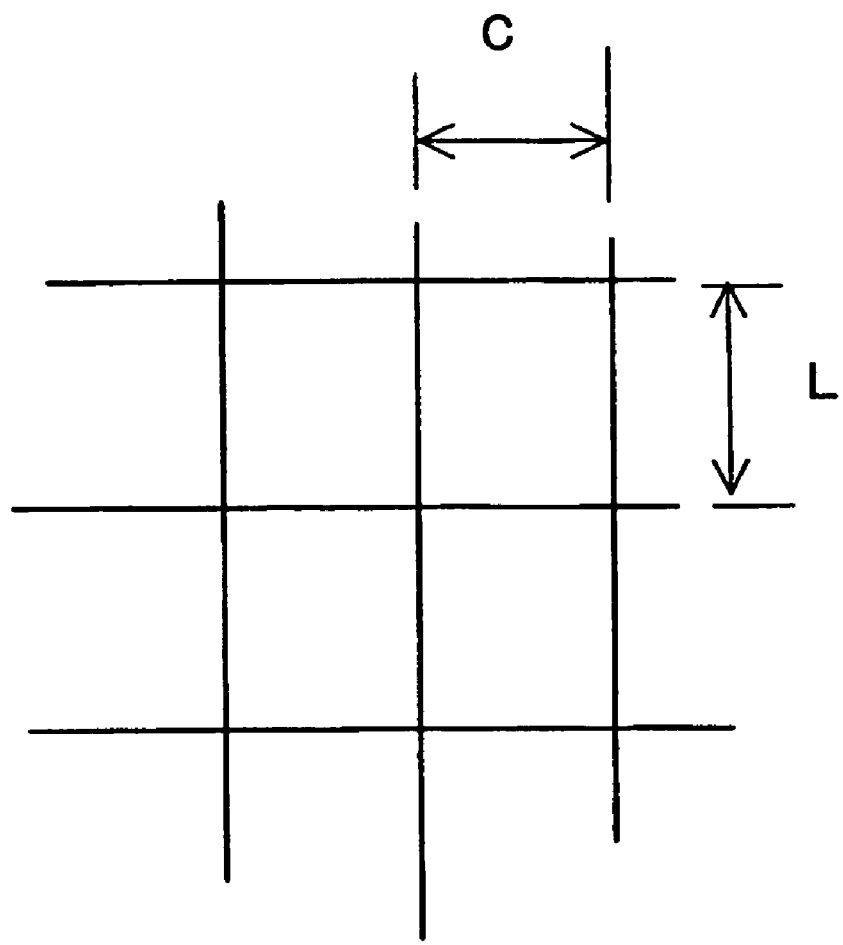
FIG. 5 is a partial view of a rectangular sieve mesh.

In the present invention, in a case where a columnar or cylindrical catalyst has an outer diameter A being larger than the length B in the axial direction, the flat surface of the column or cylinder is more susceptible to cracking, as mentioned above. As shown in FIG. 3, the minimum parallel tangential line distance S of the projected image contour of the cracked catalyst, becomes smaller than the minimum parallel tangential line distance (outer diameter A) of the projected image contour of a normal catalyst before being cracked. And, needless to say, the minimum parallel tangential line distance of the projected image contour of the cracked portion 3, becomes smaller than the minimum parallel tangential line distance (outer diameter A) of the projected image contour of the normal catalyst. Here, the above minimum parallel tangential line distance S of the cracked catalyst can be obtained as the distance between the tangential line of the outermost protruded portion in the cracked surface of the projected image contour and the tangential line at the circumference of the non-cracked surface, which is in parallel with the tangent line of the protruded portion. Thus, the above minimum parallel tangential line distance S of a catalyst cracked in its flat surface, is smaller than the outer diameter A. Accordingly, as shown in FIG. 5, such a catalyst may be sieved by means of a sieve having a rectangular sieve mesh with a width C satisfying the condition of A>C>B and a length L being at least the width, whereby removal of the cracked catalyst can efficiently be carried out.

In such a case, if C is larger than A, the non-cracked normal catalyst will pass through the sieve, such being undesirable. Further, if C is less than B, it tends to be difficult to remove the catalyst having the flat surface cracked, such being undesirable. It is preferred that C is adjusted to have a value as close as possible to the value A, whereby the cracked catalyst can efficiently be sieved up to one having S being close to A, and removal of the cracked catalyst will thereby be easy. C is preferably as close as possible to A at a level of at least 90%, preferably at least 95%, of A. In a case where a commercially available sieve according to JIS standards (JIS Z8801 1994) is to be used, C is the basic dimension closest to A, as disclosed in the test sieve standard table of said JIS standards, and it is preferred that a value having the maximum allowable error in the basic dimension added to C, is smaller than the value A. Sieving can be carried out by shaking the sieve or by letting the catalyst flow in one direction (inclusive of reciprocation) to the sieve. In a case where sieving is carried out by letting the catalyst flow in one direction by means of a sieve having a sieve mesh wherein length L is larger than width C, it is preferred to adjust the direction of L to be the same as the flow direction of the catalyst. Further, when the sieve mesh is rectangular, it may be a slit so long as length L is larger than width C. However, as L is longer, the strength tends to be low. Accordingly, L is preferably C≦L≦2C. From this viewpoint, a square sieve mesh is more preferred. This is common to all sieves having rectangular sieve meshes, which will be described hereinafter.

Further, in a case where a sieve having a circular sieve mesh is to be used, it is preferred to use a sieve having a circular sieve mesh with a diameter C satisfying the condition of A>C>B against a catalyst of a columnar or cylindrical shape having an outer diameter A being larger by more than √2 times the length B in the axial direction, whereby removal of the cracked catalyst can efficiently be carried out. In such a case, if C is larger than A, the non-cracked normal catalyst will pass through the sieve, such being undesirable. Further, if C is less than B, it becomes difficult to remove the catalyst cracked in the flat surface of the column or cylinder, such being undesirable. It is preferred that C is adjusted to be as close as possible to A, whereby removal of the cracked catalyst will be easy.

Further, in the case of a catalyst of a columnar or cylindrical shape with an outer diameter A being from 1 to 0.5 time the length B in the axial direction, the flat surface or the side surface as the outer circumference of the column or cylinder, is susceptible to cracking. Accordingly, in such a case, it is preferred to employ a sieve having a sieve mesh with a width C satisfying the condition of A>C>0.5B and a length being at least the width, whereby the removal of the cracked catalyst can be efficiently carried out.

In such a case, if C is larger than A, the non-cracked normal catalyst will pass through the sieve, such being undesirable. Further, if C is smaller than 0.5B, it tends to be difficult to remove the catalyst cracked in the side surface as the outer circumference of the column or cylinder, such being undesirable. Also, in this case, it is preferred that C is adjusted to have a value as close as possible to the value of A, whereby removal of the cracked catalyst will be easy.

Further, in the case of a catalyst of a spherical shape having an outer diameter of D, the diameter of the projected circle of the catalyst after cracking is substantially equal to the diameter of the projected circle of the normal catalyst before cracking in many cases, whereby it is difficult to remove the cracked catalyst by a sieve having a circular or square sieve mesh. In such a case, it is preferred to use a sieve having a sieve mesh with a width E satisfying the condition of D>E>0.5D and a length being larger than D, whereby removal of the cracked catalyst can be efficiently carried out.

In such a case, if E is larger than D, the non-cracked normal catalyst will pass through the sieve, such being undesirable. Further, if E is smaller than 0.5D, it tends to be difficult to remove the cracked catalyst, such being undesirable.

In the foregoing, the sieving method has been described with reference to a preferred embodiment of the present invention, wherein a sieve having a sieve mesh of a rectangular or circular shape, is used. In the case of a sieve having a sieve mesh of a rhombic or hexagonal shape, it is possible to employ a sieve wherein the diameter of the circle touching internally the rhombic or hexagonal sieve mesh, is C. If a spherical catalyst is sieved by a sieve having a rhombic or hexagonal sieve mesh, there will be fragments which can be removed and fragments which can not be removed, depending upon the cracking mode. Accordingly, against a spherical catalyst, it is advisable to avoid using a sieve having a rhombic or hexagonal sieve mesh.

By the method of the present invention, the cracked catalyst can be removed by sieving, and at that time, a pulverized catalyst can also be removed. Further, by changing the ratio of the width or diameter of the mesh sieve to the outer diameter of the catalyst, the upper limit of the size of the cracked catalyst which can be removed by sieving, can be adjusted as the case requires. It is geometrically difficult to separate by sieving a catalyst having only a portion chipped off. However, such a catalyst is not substantially influential over the pressure loss of the reaction tube and may be handled substantially in the same manner as a normal catalyst, and thus, such a catalyst is acceptable in the sieving of the present invention.

EXAMPLES

Example 1

3.65 parts of basic nickel carbonate ($NiCO_3$-$2Ni(OH)_2$-$4H_2O$) was dispersed in 3.75 parts of pure water. 1.22 parts of silicon dioxide (Carplex #67, manufactured by Shionogi & Co., Ltd.) and 2.4 parts of antimony trioxide were added thereto and stirred sufficiently. This slurry was heated, concentrated and dried, and the obtained solid was calcined at 800° C. for 3 hours. The calcined product was pulverized to at most 60 mesh. 3.8 parts of pure water in a melting vessel provided with a stirrer, was heated to 80° C., and 1.0 part of ammonium paramolybdate, 0.135 part of ammonium metavanadate, 0.130 part of ammonium paratungstate and 0.08 part of copper sulfate, and the entire amount of the powder obtained as described above, were sequentially added with stirring. This slurry containing the catalyst component was heated and dried to obtain a catalyst powder. Then, this catalyst powder was molded by a rotary tabletting machine into a shape having an outer diameter of 6 mm, an inner diameter of 3 mm and a length (height) in the axial direction of 4 mm. The obtained molded product was subjected to calcination treatment at 400° C. for 5 hours in a nitrogen gas atmosphere containing 1% of oxygen gas, to obtain a catalyst.

The above catalyst was subjected to sieving by a sieve having a square sieve mesh of 5.6×5.6 mm, whereby the catalyst remaining on the sieve was recovered. At that time, the catalyst recovered below the sieve was mostly a catalyst having a crack in the flat surface, and its proportion was 9.5% of the catalyst subjected to the sieving. Then, to the catalyst after the sieving, alumina balls having a diameter of 4.5 mm as a diluting material, were mixed so that the mixture would be, by vol %, 50% of the catalyst/50% of the alumina balls (the first diluted layer) and 80% of the catalyst/20% of the alumina balls (the second diluted layer), respectively.

Into a stainless steel reaction tube having an inner diameter of 27 mm and a length of 5 m, the above second diluted layer was packed to be 1.5 m, and then the first diluted layer was packed to be 1 m.

A pipe provided with a pressure gauge and a stop valve, was attached to the top of the reactor, and in a state where the stop valve was closed, air was sent to the pipe so that the pressure would be 29.4 kPa as calculated at 0° C., and then, the stop valve was opened to let the air flow, whereupon the value of the pressure gauge was read out. The value of the pressure gauge at that time was 4.5 kPa as calculated at 0° C.

Example 2

Preparation of the catalyst and its packing in a reaction tube were carried out in the same manner as in Example 1 except that the sieving was carried out by a sieve having a circular sieve mesh having a diameter of 5.8 mm, and the value of the pressure gauge when air was permitted to flow in the same manner and under the same conditions, was read out. At that time, the proportion of the catalyst recovered below the sieve was 9.5% of the catalyst subjected to the sieving, and the read out value of the pressure gauge was 4.5 kPa as calculated at 0° C.

Comparative Example 1

Preparation of the catalyst and its packing in a reaction tube were carried out in the same manner as in Example 1 except that no sieving was carried out, and the value of the pressure gauge when air was permitted to flow in the same manner and under the same conditions, was read out. The value of the pressure gauge at that time was 7.0 kPa as calculated at 0° C.

Example 3

Preparation of the catalyst and its packing in a reaction tube were carried out in the same manner as in Example 1 except that molding was carried out so that the shape of the catalyst would be an outer diameter of 6 mm, an inner diameter of 3 mm and a height of 10 mm, and sieving was carried out by a sieve having a rectangular sieve mesh of 5.6 mm×11.2 mm, and the value of the pressure gauge when air was permitted to flow in the same manner and under the same conditions, was read out. At that time, the proportion of the catalyst recovered below the sieve was 11.1% of the catalyst subjected to the sieving, and the read out value of the pressure gauge was 3.3 kPa as calculated at 0° C.

Comparative Example 2

Preparation of the catalyst and its packing in a reaction tube were carried out in the same manner as in Example 3 except that no sieving was carried out, and the value of the pressure gauge when air was permitted to flow in the same manner and under the same conditions, was read out. The value of the pressure gauge at that time was 5.8 kPa as calculated at 0° C.

Example 4

Preparation of the catalyst and its packing in a reaction tube were carried out in the same manner as in Example 1 except that molding was carried out by means of a rotary granulator so that the shape of the catalyst was spherical with a diameter of 6 mm, and sieving was carried out by a sieve having a rectangular sieve mesh of 5.6 mm×11.2 mm, and the value of the pressure gauge when air was permitted to flow in the same manner and under the same conditions, was read out. At that time, the proportion of the catalyst recovered below the sieve was 5.6% of the catalyst subjected to the sieving, and the read out value of the pressure gauge was 4.6 kPa as calculated at 0° C.

Comparative Example 3

Preparation of the catalyst and its packing in a reaction tube were carried out in the same manner as in Example 4 except that no sieving was carried out, and the value of the pressure gauge when air was permitted to flow in the same manner and under the same conditions, was read out. The value of the pressure gauge at that time was 5.5 kPa as calculated at 0° C.

INDUSTRIAL APPLICABILITY

According to the present invention, prior to packing a solid catalyst in a reaction tube, a cracked catalyst is removed by sieving, whereby the pressure loss in the reaction tube can be reduced. Thus, a reaction can be carried out under the predetermined operation conditions, and the present invention is applicable to packing of various solid catalysts.

The entire disclosure of Japanese Patent Application No. 2004-014632 filed on Jan. 22, 2004 including specification, claims, drawings and summary is incorporated herein by reference in its entirety.

What is claimed is:

1. A method for packing a solid catalyst, comprising:
sieving the solid catalyst to remove cracked catalyst; and thereafter
packing the sieved catalyst in a reactor,
wherein sieving is carried out, against a solid catalyst of a columnar or cylindrical shape having an outer diameter A being larger than length B in the axial direction of the solid catalyst, by using a sieve having a sieve mesh with a width C satisfying the condition of A>C>B and a length being at least the width.

2. A method for packing a solid catalyst, comprising:
sieving the solid catalyst to remove cracked catalyst; and thereafter
packing the sieved catalyst in a reactor,
wherein sieving is carried out, against a solid catalyst of a columnar or cylindrical shape having an outer diameter A being larger by more than $\sqrt{2}$ times length B in the axial direction of the solid catalyst, by using a sieve having a circular sieve mesh with a diameter C satisfying the condition of A>C>B.

3. A method for packing a solid catalyst, comprising:
sieving the solid catalyst to remove cracked catalyst; and thereafter packing the sieved catalyst in a reactor,
wherein sieving is carried out, against a solid catalyst of a columnar or cylindrical shape with an outer diameter A being from 1 to 0.5 times length B in the axial direction of the solid catalyst, by using a sieve having a sieve mesh with a width C satisfying the condition of A>C>0.5B and a length being at least the width.

4. The method for packing a solid catalyst according to any one of claims 1 to 3, wherein the proportion of C to A is at least 90%.

5. A method for packing a solid catalyst, comprising:
sieving the solid catalyst to remove cracked catalyst; and thereafter
packing the sieved catalyst in a reactor,
wherein sieving is carried out, against a solid catalyst of a spherical shape having an outer diameter of D, by using a sieve having a sieve mesh with a width E satisfying the condition of D>E>0.5D and a length being larger than D.

* * * * *